Oct. 20, 1953        D. A. MARRA        2,655,988
GAS TORCH TIP HAVING PROTECTIVE TERMINAL SHOE
Filed May 24, 1947
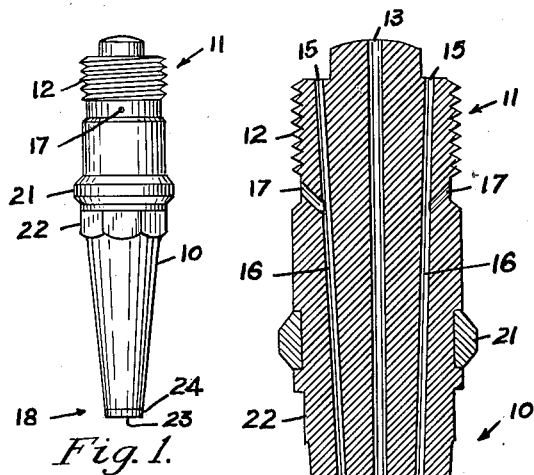
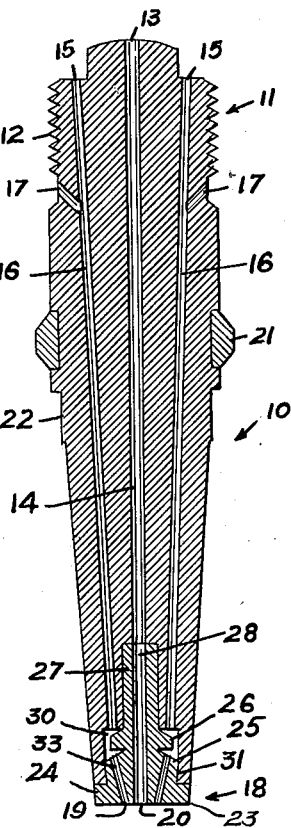
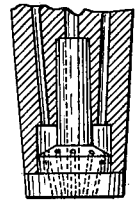
Fig. 6.
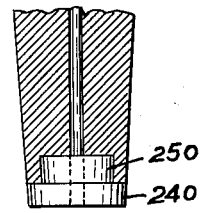
Fig. 7.
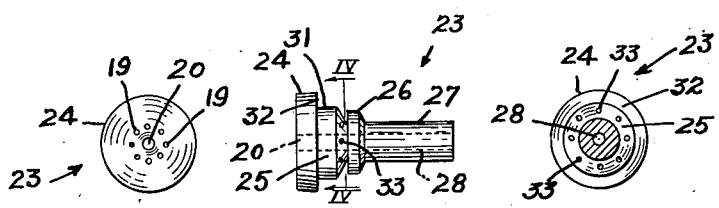
Fig. 5.     Fig. 3.     Fig. 4.
Inventor
Daniel A. Marra
By Christy, Parmelee and Strickland
his Attorneys Patented Oct. 20, 1953

2,655,988

UNITED STATES PATENT OFFICE 2,655,988

GAS TORCH TIP HAVING PROTECTIVE TERMINAL SHOE

Daniel A. Marra, Cheswick, Pa.

Application May 24, 1947, Serial No. 750,183

3 Claims. (Cl. 158—27.4)

This invention relates to torch tips, particularly to cutting torches, that is, to those instruments that are used for cutting metal by burning or melting the metal in the region where severance is to be effected.

A cutting torch ordinarily (but not always) is carried in the hand of a workman. It is connected to supplies of combustible gas and of oxygen under pressure, and the connections are flexible, that the instrument may be freely manipulated.

The requisites of a cutting torch are that it shall deliver through its tip, and successively as the operation progresses, first, a heating flame that, brought to play upon the metal article to be cut, shall bring the metal in the immediate region of attack to substantially the temperature of combustion. When such temperature has been attained, it is requisite, second, that the torch shall deliver to the so heated region a stream of oxygen. The oxygen so delivered burns (cuts) the heated metal, and the burning of the metal releases heat, so that the metal is progressively, beginning with the region of initial heating and continuing therefrom, brought to the temperature of combustion, and progressively cut through. Additionally, it is ordinarily a matter of convenience, if not necessity, that at all times when the torch, though not in use, is held ready for use, a pilot flame shall be burning from its tip, to afford ignition when the torch is put to use.

The tip of a cutting torch of well-standardized type is an essentially tubular device having a central axial passageway for cutting oxygen, and surrounding, concentrically arranged, passageways for a combustible mixture of fuel gas and oxygen. It is conventional to make the tip either of a single blank of metal properly machined to provide the necessary passageways, or to make it of two tubular members and to assemble them telescopically. The tip is at one end, the head end, adapted to be brought to bear in gas-tight union upon a seat formed in the head of the torch, and there secured by means of a threaded union or coupler. At the opposite end, the delivery end, a ring of orifices surrounds the outlet of the central passageway for the cutting oxygen, and these orifices collectively provide the outlet for the combustible mixture of gas and oxygen. When the tip is assembled with the torch and is in service, the combustible mixture is delivered from the ring of orifices, and the intensity of flow is, by means of valves in the torch, regulated to sustain at the will of the operator either a pilot flame or a heating flame.

In service the extreme temperatures developed in the immediate vicinity of the delivery end of the tip in the presence of oxygen cause such end of the tip to soften or melt, unless the operator takes great care at all times that the end of the tip be held at exactly the right interval away from the work. Also, rough usage of a torch in the hands of the workman subjects the end of the tip to mutilation. Tips of prior construction have never proved adequately enduring under normal conditions of service, for, no matter how careful a workman may be, he sooner or later will accidentally allow the end of the tip to come too close to the work and become overheated and damaged, or he will drop the torch, or otherwise subject the end of the tip to abuse, wherefore replacement of the tip is required. This matter of tip replacements has always been an item of substantial expense to the industries using cutting and welding torch equipment.

My invention consists in an improved structure for fortifying the delivery end of a torch tip, with the consequence that the end of the tip is adapted to withstand extremely rough usage, as well as high temperatures. The invention stems from the discovery that the carbides of the more refractory metals may be formed into a wearing shoe for the delivery end of a torch tip, whereby the usual care need not be taken to avoid tip damage. Indeed, it has been found that a torch tip, formed principally of a material of relatively low strength and temperature resistance, may be provided with a cemented carbide shoe at its delivery end, and that the carbide shoe is not only strong and enduring under the heat and oxygen to which it is exposed in service, but under such heat is characterized by a high resistance to wear. In consequence, the tip may be applied in physical contact with the work and may be slid thereon, insuring a more steady application of the torch effect, particularly in those cases in which the operation is manual. Furthermore, when the carbide shoe is designed and incorporated in the tip structure in accordance with this invention, it is resistant to fracture.

The invention will be understood upon reference to the accompanying drawings, in which:

Fig. 1 is a view in side elevation of a tip embodying the invention;

Fig. 2 is a view of the tip in axial section and to larger scale;

Fig. 3 is a view in side elevation of the carbide shoe incorporated in the tip structure;

Fig. 4 is a view in cross section of the shoe, as seen on the plane IV—IV of Fig. 3;

Fig. 5 is a view of the shoe in end elevation as seen from the left of Fig. 3;

Fig. 6 is a fragmentary view, showing in axial section a tip of the invention in modified form; and Fig. 7 is a view comparable with Fig. 6, illustrating another modification.

Referring to Figs. 1 and 2 of the drawings, the tip structure comprises a body 10 formed of copper, brass, aluminum or other relatively soft material of high thermal conductivity and readily machinable character. The head end 11 of the tip body is externally threaded, as at 12, or is otherwise formed in conventional manner to be secured in a torch head, with the inlet 13 of passage 14 in hermetic union with the oxygen supply line of the torch (not shown) and with the inlets 15 of the passages 16 in communication with the gas supply line of the torch. By the term "gas" is intended a combustible high heat-value gas, such as acetylene. In this case there is not a single gas passage 16, but four of them, equispaced about the central oxygen passage 14, and each gas passage 16 includes an auxiliary inlet 17 in the head of the tip, through which oxygen is admitted from the torch in such quantities as to provide a highly combustible mixture of gas and oxygen. As will presently appear the gaseous mixture flowing through the passages 16 emerges from the delivery end 18 of the tip in a ring of outlets 19 that are arranged concentrically of the outlet 20 of the central oxygen passage 14. The jets of flame fed through the outlets 19, at heating intensity, are played upon the work until the body of the work is locally heated to the point at which a jet of oxygen will cut it, at which time the usual control valves in the torch are operated, reducing the heating flames to pilot-flame intensity, and delivering a cutting stream of oxygen through the passage 14 and outlet 20. This specification need not be unduly prolonged with the various known details of tip structure and torch operation which are well known in the art, and other than in the features wherein this invention resides the tip structure may be variously shaped and/or constructed for any of the great number of torches and practices so well known in the field at the present time. Suffice it to note that, while the body 10 of the tip is principally formed of a single blank of metal, it may be formed of two or more tubular members telescopically assembled, as is, for example, the tip shown in Letters Patent No. 2,368,716, granted to me February 6, 1945. The tip body is provided with an external collar or shoulder 21, separately formed and pressed into rigid assembly with the tip body, or integrally formed on the tip body, for engagement with the usual coupler or union (not shown) that assists in securing and sealing the head end of the tip in the torch. Additionally, a nut portion 22 may be fashioned on the tip body to receive a wrench during the installation or removal of the tip from the torch.

In accordance with the invention a wearing shoe 23 of cemented or sintered carbide is provided at the delivery end of the tip, this material comprising a relatively hard, highly refractory material having a relatively low thermal conductivity and high strength and durability when exposed to steel at fusing temperature. This wearing shoe comprises an outer disc portion 24 that entirely overlies the delivery end of the tip body 10; a body portion 25 that extends into the tip body; an inner disc portion 26; and a cylindrical tubular portion 27. The portions 25, 26 and 27 are of sequentially reduced diameters; that is, the portion 26 is of smaller effective diameter than the portion 25, as is the portion 27, and the portion 27 is of smaller diameter than the portion 26. The wearing shoe includes an axial bore 28 that registers with the oxygen passage 14 in the tip body 10, and the tubular portion 27 of the shoe extends with snug fit in a bore 29 formed therefor in the body of the tip adjacent to its delivery end, thus insuring delivery of oxygen through the outlet 20 without danger of combustible gas leaking into the oxygen streams from the chamber 30, presently to be described. The body portion 25 of the wearing shoe includes an annular surface 31 which is inclined or tapered with respect to the axis of the tip, with the divergence of the taper being directed inward from the outer end of the tip assembly. Complete security and hermetic assembly of the parts are obtained by impressing the substance of the tip body 10 into tight union with the tapered body portion 25 of the shoe and with a shoulder 32 formed between said portion 25 and the portion 24.

Within the delivery end of the tip structure a mixing chamber 30 is formed by and between the portion 25 of the wearing shoe and the adjacent portions of the tip body 10. The passages 16 deliver streams of mixed gas and oxygen into this chamber, wherein the thorough mixing of the gas and oxygen is completed before the mixture enters the circular series passages 33 that extend through the shoe body portions 25 and 24 to the outlets 19.

The portion 26 of wearing shoe structure forms a mixing device in the chamber 30. The upper face (Fig. 2) of the collar-like portion 26 is tapered downwardly, and the gaseous mixture delivered by the passages 16 are directed upon this inclined face, causing the gaseous streams to spread and intermingle. A fine clearance is provided between the periphery of this portion 26 and the adjacent wall of the mixing chamber, so that the mixed gas and oxygen must flow at augmented velocity and intimacy into the mixing chamber space beneath the device 26, whence the combustible mixture is delivered to the outlets 19.

The foregoing specification will clearly reveal to those skilled in the art an exemplary embodiment of the improved tip of my invention, affording advantages of the nature indicated. Additionally, it may be noted that the wearing shoe of my invention permits the principal body portion 10 of the tip to be constructed of aluminum, a plentiful metal which has heretofore been precluded from such use because of its inability to withstand rough usage and high temperatures.

In certain fields of service the mixing device or portion 26 of the wearing shoe may be eliminated, as shown in Fig. 6. And in case of a welding torch tip, or any type of blow pipe in which there is no problem of unintended intermingling or leakage of one gas with another, the wearing shoe of the invention may take the form of that shown at 240, 250 in Fig. 7. These and other variations and modifications will be found within the spirit of the invention defined in the appended claims.

In the foregoing specification, my reference to carbide, the material of relatively high temperature resistance of which the wearing shoe is formed, includes the hard carbides of tungsten, tantalum, titanium, silicon, zirconium, beryllium, thorium, vanadium, chromium, molybdenum, uranium, boron, as well as the alloys and mixtures of such elements with each other and with iron. The particular method of fashioning and forming the shoe and whether the material be known as cemented carbide or sintered carbide are matters well understood in the metallurgical art, and need not be further dwelt upon in this specification directed to the Torch Tip Art. Suffice it to say that in the appended claims where I use the word "carbide," I intend to include the hard metallic compositions of the class mentioned, whatever may be the specific composition or the method of its production.

Notice is hereby given of application Ser. No. 23,669 and application Ser. No. 23,670, both filed by me on April 28, 1948, and directed to torch tip structures.

I claim:

1. A blow torch tip comprising an elongate outer body formed of a metal which is relatively soft and possesses relatively high thermal conductivity with low strength and durability when exposed to steel at welding temperature in the presence of oxygen, said body having a head end, a delivery end and a longitudinal bore, and a perforate terminal protecting shoe at said delivery end formed of a relatively hard, highly refractory sintered carbide having relatively low thermal conductivity with high strength and durability when exposed to said temperature in the presence of oxygen, said tubular body and said perforate shoe being partially telescoped one within the other, with the perforation in the shoe aligned with the bore in said elongate body, to provide a continuous passage throughout the elongate body and shoe of the assembled tip structure, said shoe having a relatively thin outer disc portion and an integral body or shank portion of smaller cross section than the disc portion whereby a peripheral shoulder is formed between said shoe portions, the disc portion of said shoe overlying the delivery end of said outer body in intimate contact therewith, the substance of said elongate outer body being impressed and shaped upon the shank portion and shoulder of said shoe to provide a uniformly distributed reinforcement of the shoe against thermal and mechanical shocks encountered in service and also to provide a hermetic union of the parts that is indestructible without the intentional substantial destruction of said outer elongate body.

2. A blow torch tip comprising an elongate outer body formed of a metal which is relatively soft and possesses relatively high thermal conductivity with low strength and durability when exposed to steel at welding temperature in the presence of oxygen, said body having a head end, a delivery end and a longitudinal bore, and a perforate terminal protecting shoe at said delivery end formed of a relatively hard, highly refractory sintered carbide having relatively low thermal conductivity with high strength and durability when exposed to said temperature in the presence of oxygen, said tubular body and said perforate shoe being partially telescoped one within the other, with the perforation in the shoe aligned with the bore in said elongate body, to provide a continuous passage throughout the elongate body and shoe of the assembled tip structure, said shoe having a relatively thin outer disc portion and an integral body or shank portion of smaller cross section than the disc portion whereby a peripheral shoulder is formed between said shoe portions, the disc portion of said shoe overlying the delivery end of said outer body in intimate contact therewith, the substance of said elongate outer body being impressed and shaped upon the shank portion and shoulder of said shoe to provide a uniformly distributed reinforcement of the shoe against thermal and mechanical shocks encountered in service and also to provide a hermetic union of the parts that is indestructible without the intentional substantial destruction of said outer elongate body, a chamber formed by and between the outer body of the tip and the shank of said shoe, passages opening through said outer body into said chamber and orifices opening outwardly from said chamber through the disc portion of said shoe.

3. A blow torch tip comprising an elongate outer body formed of a metal which is relatively soft and possesses relatively high thermal conductivity with low strength and durability when exposed to steel at welding temperature in the presence of oxygen, said body having a head end, a delivery end and a longitudinal bore, and a perforate terminal protecting shoe at said delivery end formed of a relatively hard, highly refractory sintered carbide having relatively low thermal conductivity with high strength and durability when exposed to said temperature in the presence of oxygen, said tubular body and said perforate shoe being partially telescoped one within the other, with the perforation in the shoe aligned with the bore in said elongate body, to provide a continuous passage throughout the elongate body and shoe of the assembled tip structure, said shoe having a relatively thin outer disc portion and an integral body or shank portion of smaller cross section than the disc portion whereby a peripheral shoulder is formed between said shoe portions, the disc portion of said shoe overlying the delivery end of said outer body in intimate contact therewith, the substance of said elongate outer body being impressed and shaped upon the shank portion and shoulder of said shoe to provide a uniformly distributed reinforcement of the shoe against thermal and mechanical shocks encountered in service and also to provide a hermetic union of the parts that is indestructible without the intentional substantial destruction of said outer elongate body, a chamber formed by and between the outer body of the tip and the shank of said shoe, passages opening through said outer body into said chamber and orifices opening outwardly from said chamber through the disc portion of said shoe, and a collar on the shank of said shoe, said collar extending transversely of said chamber.

DANIEL A. MARRA.

References Cited in the file of this patent

UNITED STATES PATENTS

| Number | Name | Date |
| --- | --- | --- |
| 1,002,134 | Burdett | Aug. 29, 1911 |
| 1,114,706 | Brousseau | Oct. 20, 1914 |
| 1,280,068 | Moorehouse | Sept. 24, 1918 |
| 1,597,554 | Thorpe et al. | Aug. 24, 1926 |
| 2,181,135 | Kehl | Nov. 28, 1939 |
| 2,207,655 | Cain | July 9, 1940 |
| 2,266,834 | Walker et al. | Dec. 23, 1941 |
| 2,277,472 | Anderson | Mar. 29, 1942 |
| 2,294,392 | Egger et al. | Sept. 1, 1942 |
| 2,317,786 | Lubbe | Apr. 27, 1943 |
| 2,365,411 | Jacobsson | Dec. 19, 1944 |
| 2,392,593 | Jenkins | Jan. 8, 1946 |
| 2,425,709 | Bucknam et al. | Aug. 19, 1947 |
| 2,427,545 | Berger | Sept. 16, 1947 |
| 2,433,539 | Westerman | Dec. 30, 1947 |

OTHER REFERENCES

Metals Handbook (1939 edition), published by American Society for Metals, p. 915. (Copy in Scientific Library.)